United States Patent
Klimes

(10) Patent No.: US 8,561,401 B2
(45) Date of Patent: Oct. 22, 2013

(54) PEDAL FEEL SIMULATOR ACTUATOR AND CUTOFF ASSEMBLY

(75) Inventor: Milan Klimes, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 655 days.

(21) Appl. No.: 12/846,492

(22) Filed: Jul. 29, 2010
(Under 37 CFR 1.47)

(65) Prior Publication Data
US 2012/0023927 A1    Feb. 2, 2012

(51) Int. Cl.
*B60T 13/20* (2006.01)

(52) U.S. Cl.
USPC .................................. 60/538; 60/555; 60/582

(58) Field of Classification Search
USPC .......... 60/538, 547.1, 555, 582, 593, 550, 594
See application file for complete search history.

(56) References Cited

U.S. PATENT DOCUMENTS

| 5,036,665 A | 8/1991 | Brown |
| 5,720,170 A | 2/1998 | Hageman et al. |
| 6,267,456 B1 | 7/2001 | Crombez |
| 2003/0160504 A1* | 8/2003 | Chris .......................... 303/114.1 |

* cited by examiner

*Primary Examiner* — Edward Look
*Assistant Examiner* — Logan Kraft
(74) *Attorney, Agent, or Firm* — Maginot, Moore & Beck

(57) ABSTRACT

A braking system includes an emulator cylinder, an emulator actuator piston within the emulator cylinder, an emulator actuator chamber within the emulator cylinder defined in part by the emulator actuator piston, a pedal feel simulator including an input port in fluid communication with the emulator actuator chamber and an output port, a selector piston movable within the emulator cylinder between a first position and a second position, and a poppet valve operably connected to the emulator actuator piston, the poppet valve movable by the emulator actuator piston between a deactivated position and an actuated position and configured such that (i) when the selector piston is in the first position and the poppet valve is in the actuated position, the poppet valve is closed and the emulator actuator chamber is not in fluid communication with the reservoir through the poppet valve, and (ii) when the selector piston is in the second position and the poppet valve is in the actuated position, the poppet valve is open and the emulator actuator chamber is in fluid communication with the reservoir through the poppet valve.

18 Claims, 7 Drawing Sheets

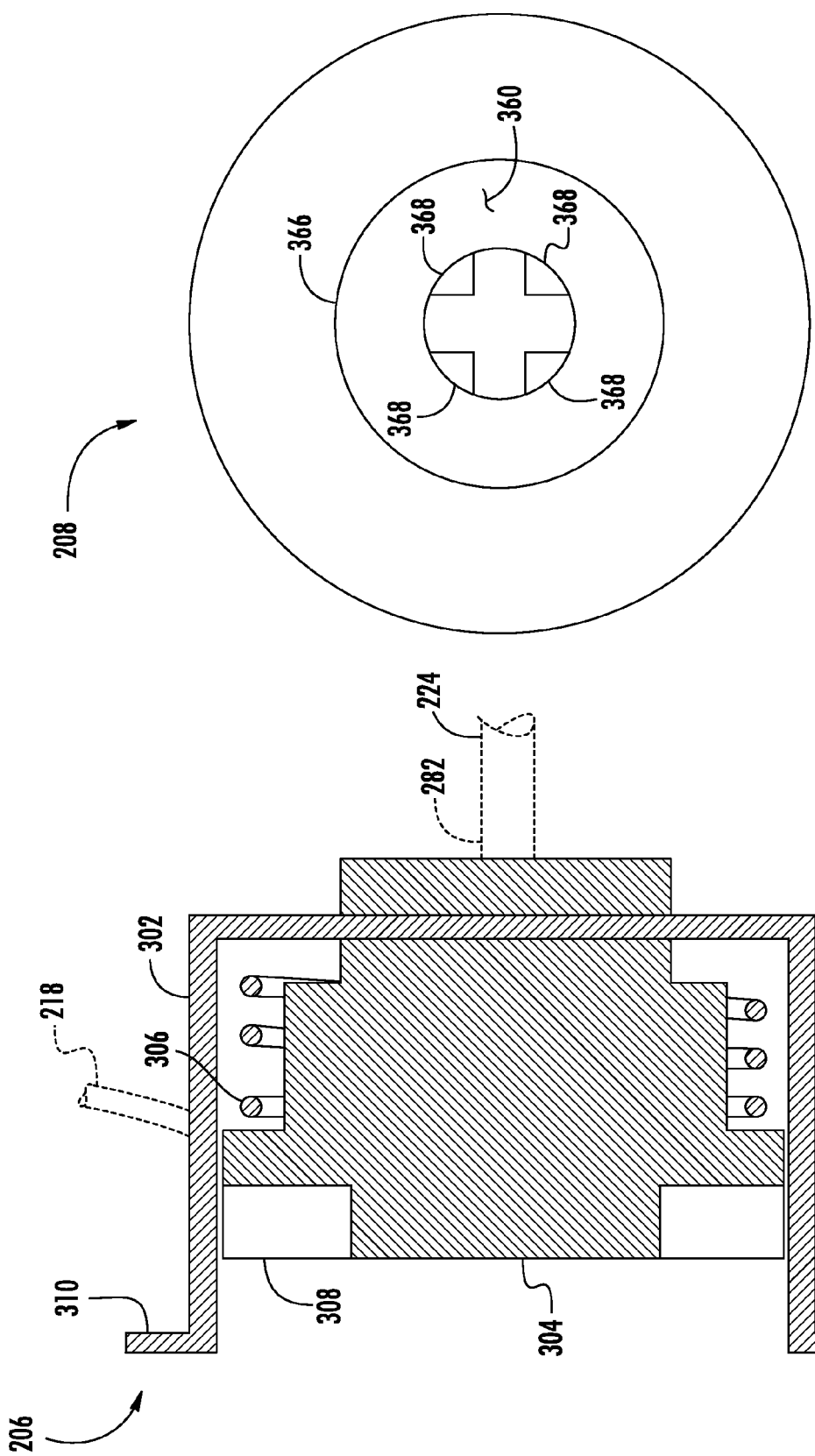

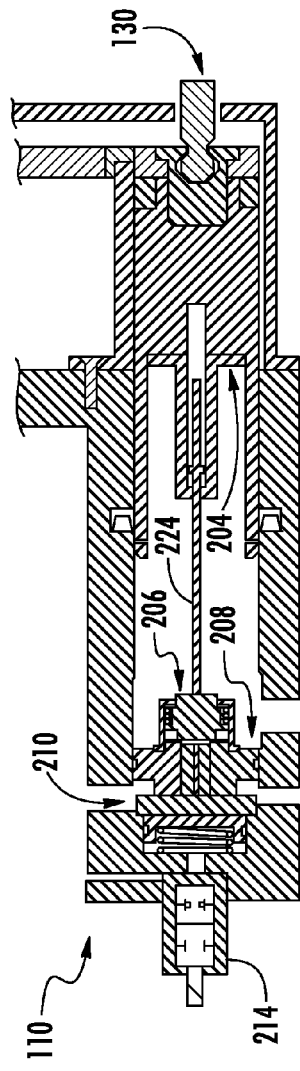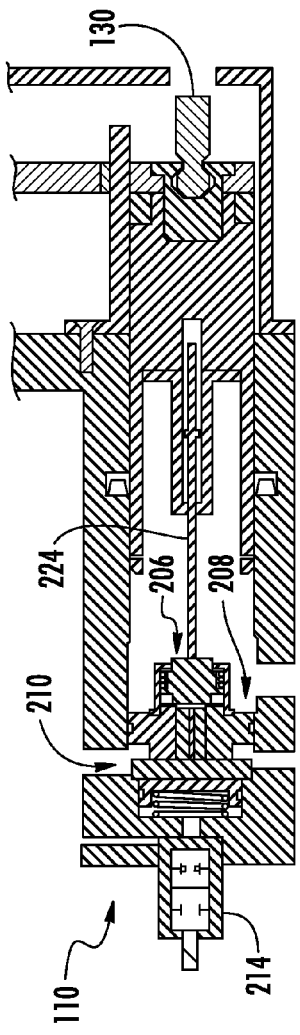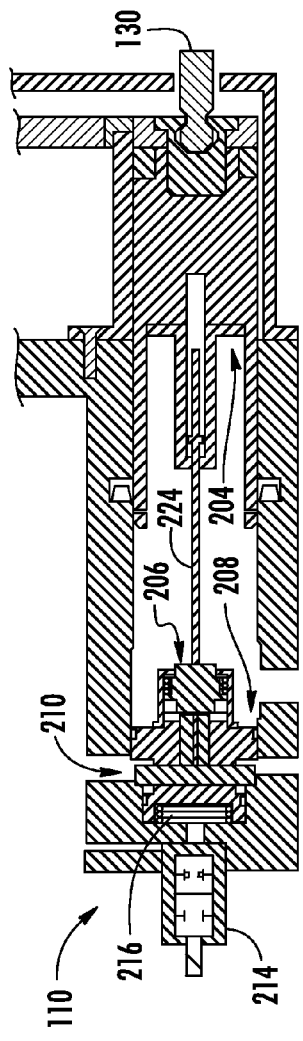

PEDAL FEEL SIMULATOR ACTUATOR AND CUTOFF ASSEMBLY

FIELD

The invention relates to braking systems, and in particular to a braking system with a pedal feel simulator.

BACKGROUND

Significant progress has been made in vehicular braking systems in recent years. Among these developments are anti-lock braking systems (ABS) and regenerative braking systems. The latter is used in electric and hybrid-electric vehicles. In regenerative braking systems, a vehicle's brake pedal is mechanically decoupled from downstream braking circuits. A sensor associated with an input rod coupled to a brake pedal provides an electrical signal to an electronic control unit (ECU). The signal is representative of the brake pedal position. Since the brake pedal is mechanically decoupled from the downstream braking circuits, a brake pedal feel simulator is often used to simulate the feel of a conventional braking system by providing a force feedback to the vehicle operator at the brake pedal. At the same time, the ECU controls the braking system to apply a braking force consistent with the brake pedal position. An electrical regenerative system and/or a hydraulic braking system provide the necessary braking force.

In the event of a failure of the hydraulic system and/or the electrical regenerative system, it is necessary for the braking system to switch modes of operation so that the brake pedal is mechanically coupled to the downstream brake circuits. In such a failure mode, the force applied to the brake pedal is transferred to the downstream brake circuits to generate the necessary braking force to halt a vehicle.

There is a need to provide an improved braking system that is operable in a normal mode in which a brake pedal is mechanically decoupled from the downstream braking circuits and a fallback mode in which the brake pedal is mechanically coupled to the downstream braking circuits.

SUMMARY

According to one embodiment of the present disclosure, there is provided a braking system. The braking system includes an emulator cylinder, an emulator actuator piston within the emulator cylinder, an emulator actuator chamber within the emulator cylinder defined in part by the emulator actuator piston, a pedal feel simulator including an input port in fluid communication with the emulator actuator chamber and an output port, a selector piston movable within the emulator cylinder between a first position and a second position, and a poppet valve operably connected to the emulator actuator piston, the poppet valve movable by the emulator actuator piston between a deactivated position and an actuated position and configured such that (i) when the selector piston is in the first position and the poppet valve is in the actuated position, the poppet valve is closed and the emulator actuator chamber is not in fluid communication with the reservoir through the poppet valve, and (ii) when the selector piston is in the second position and the poppet valve is in the actuated position, the poppet valve is open and the emulator actuator chamber is in fluid communication with the reservoir through the poppet valve.

According to one embodiment of the present disclosure, there is provided a braking system. The braking system includes an emulator cylinder, an emulator actuator piston within the emulator cylinder, an emulator actuator chamber located forwardly of the emulator actuator piston within the emulator cylinder, a pedal feel simulator including an input port in fluid communication with the emulator actuator chamber and an output port, a selector piston located forwardly of the emulator actuator chamber and movable within the emulator cylinder between a first position and a second position, and a poppet valve operably connected to the emulator actuator piston, the poppet valve movable by the emulator actuator piston between a rearward position and a forward position and configured such that (i) when the selector piston is in the first position the poppet valve can be seated against the selector piston with the emulator actuator chamber not in fluid communication with a reservoir through the poppet valve, and (ii) when the selector piston is in the second position the poppet valve cannot be seated against the selector piston and the emulator actuator chamber is in fluid communication with the reservoir through the poppet valve.

BRIEF DESCRIPTION OF THE DRAWINGS

FIG. 4 depicts a cross sectional view of the poppet valve assembly of FIG. 2;

FIG. 5A depicts a front view of the selector valve assembly of FIG. 2;

FIG. 7 depicts a fragmentary cross sectional view of the emulator assembly of FIG. 1 in one operational position in a normal mode, wherein the poppet assembly is firmly engaged with the poppet valve assembly in an actuated position;

FIG. 8 depicts a fragmentary cross sectional view of the emulator assembly of FIG. 1 in another operation position in the normal mode, wherein the actuator piston assembly is further moved leftward within the cylinder as compared to the actuator piston of FIG. 7;

FIG. 9 depicts a fragmentary cross sectional view of the emulator assembly of FIG. 1 in one operation position in a fallback mode, wherein the poppet assembly is in a deactivated position.

DESCRIPTION

Figure 1:
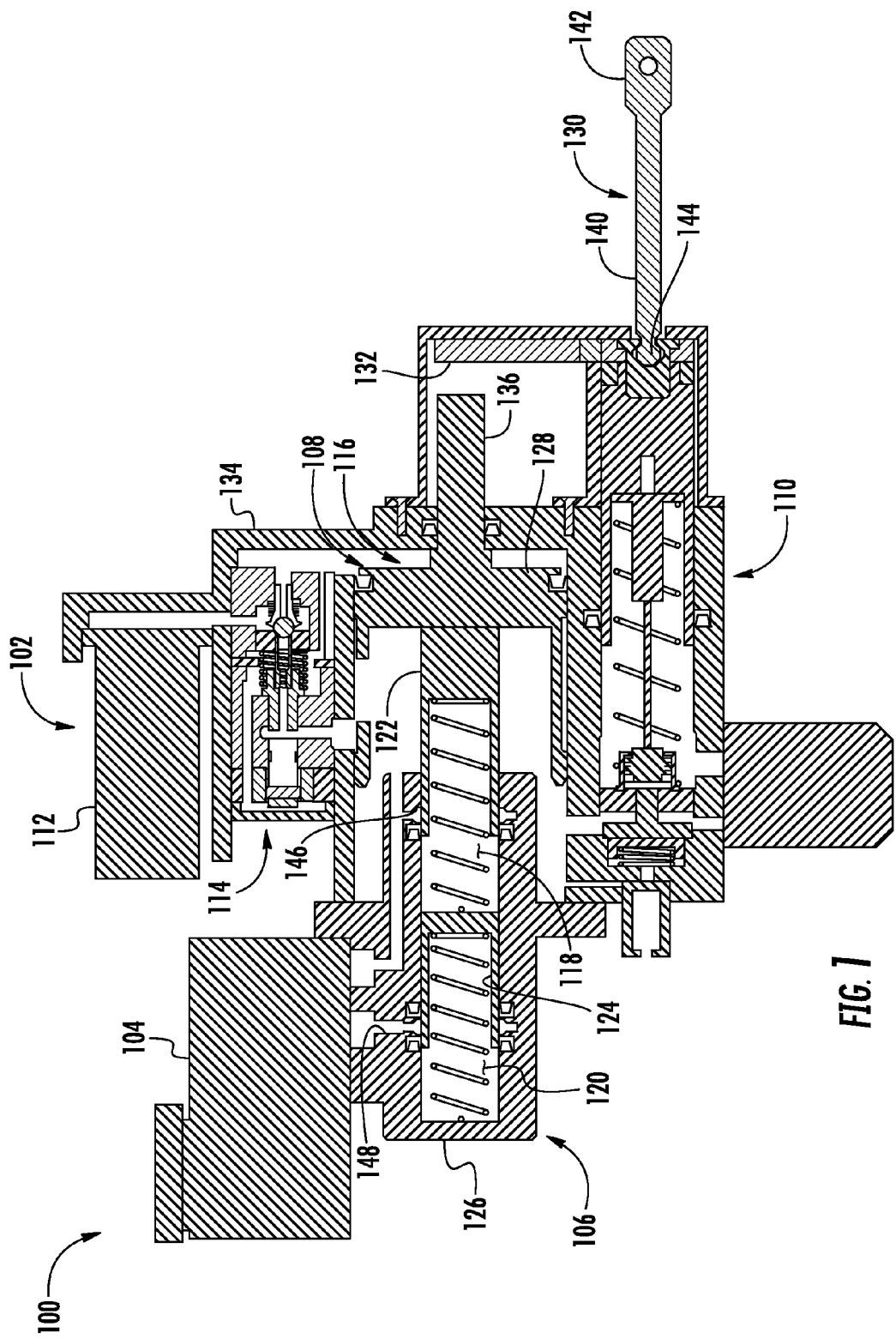
FIG. 1 depicts a fragmentary cross sectional view of a braking system including a high pressure regulator with a high pressure accumulator, a reservoir, a master cylinder assembly, and an emulator assembly.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Referring to FIG. 1, a fragmentary cross sectional view of a braking system 100 is depicted. The braking system 100 includes a high pressure regulating system 102, a reservoir 104, a master cylinder assembly 106, a booster assembly 108, an emulator assembly 110, and an input rod assembly 130. The high pressure regulating system 102 is fluidly coupled to the booster assembly 108. The booster assembly 108 is mechanically coupled to the master cylinder assembly 106. The master cylinder assembly 106 is fluidly coupled to the reservoir 104 and to downstream braking circuits (not shown).

The high pressure regulating system 102 includes a high pressure accumulator 112 for storing high pressure fluid, and a regulating valve assembly 114. The regulating valve assembly 114 is electrically coupled to and controlled by an electronic control unit (ECU) (not shown). The regulating valve assembly 114 is configured to regulate pressure from the high pressure accumulator 112, which is supplied from a high pressure fluid generator, e.g., a pump (not shown), and provide high pressure fluid (with the pressure regulated) to a boost chamber 116 of the booster assembly 108.

The reservoir 104 provides fluid to a primary chamber 118 and a secondary chamber 120 of the master cylinder assembly through inlets 146 and 148, respectively. The primary chamber 118 is defined by a primary piston 122 and a secondary piston 124, while the secondary chamber 120 is defined by the secondary piston 124 and a cylinder wall portion 126 of the master cylinder assembly 106. The primary chamber 118 is coupled to a first downstream braking circuit (not shown) through a first outlet (not shown) while the secondary chamber 120 is coupled to a second downstream circuit chamber (not shown) through a second outlet (not shown).

The booster assembly 108 is coupled to the high pressure regulating system 102. The booster assembly includes a booster piston 128 which is in fluid contact with the boost chamber 116. The boost chamber 116 is thus defined by the booster piston 128 and a housing 134. The booster piston 128 includes a rear portion 136 which extends through the housing 134.

The input rod assembly 130 includes a rod 140, a clevis 142, and a ball portion 144. The clevis 142 is mechanically coupled to a brake pedal (not shown). The ball portion 144 allows pivoting of the entire input rod assembly 130 by coupling with the emulator assembly 110. The input rod assembly 130 is configured to transfer movement of the brake pedal (not shown) to the emulator assembly 110.

The input rod assembly 130 is also coupled to an apply link 132 and is configured to transfer movement of the brake pedal (not shown) to the rear portion 136 of the booster piston 128 in one operational mode, as described further below.

Figure 2:
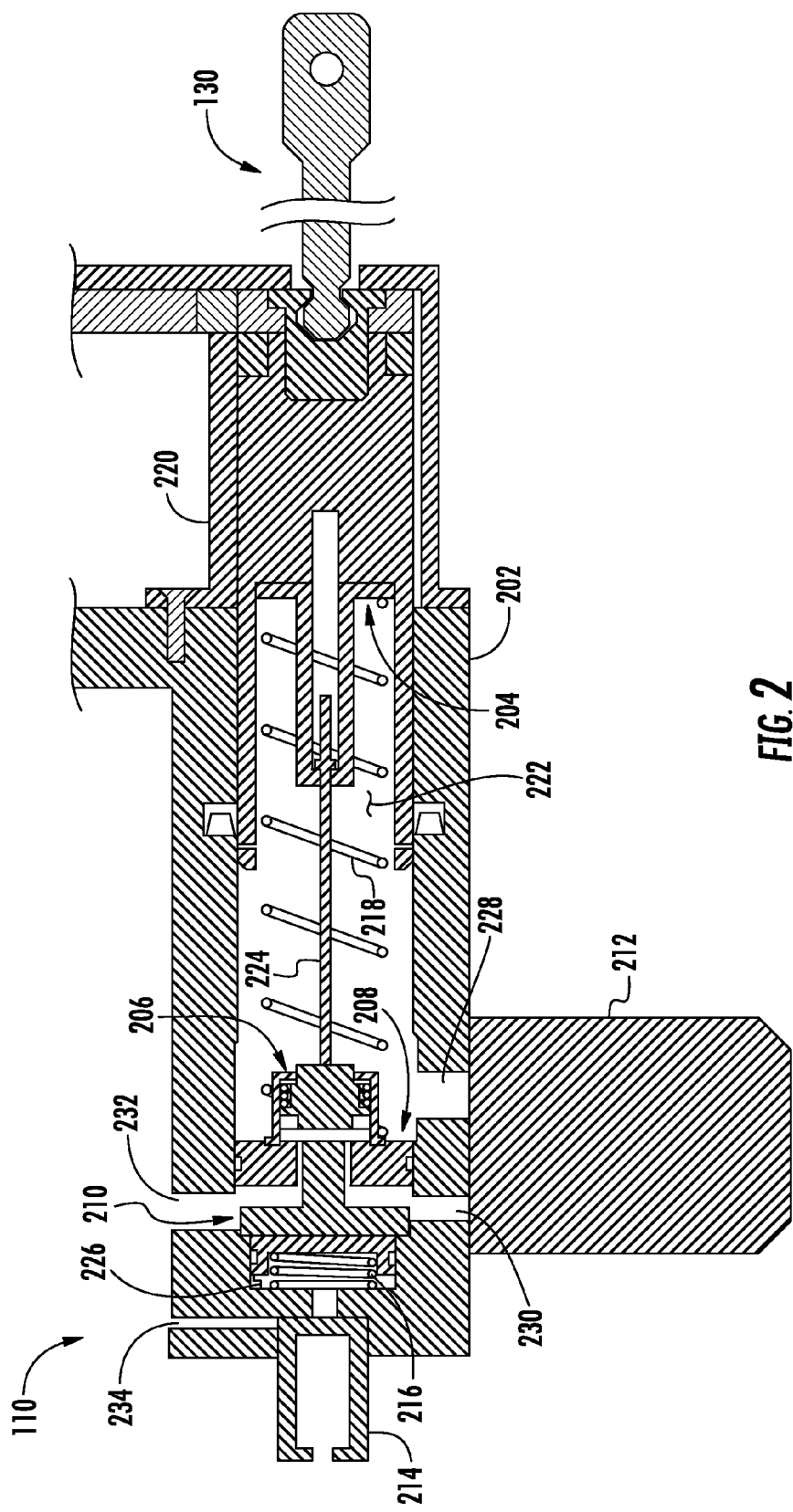
FIG. 2 depicts a fragmentary cross sectional view of the emulator assembly of FIG. 1, the emulator includes a cylinder, an actuator piston assembly, an actuator shaft, a poppet valve assembly, a selector piston assembly, and a pin assembly.

Referring to FIG. 2, a detailed cross sectional view of the emulator assembly 110 is depicted. The emulator assembly 110 includes a cylinder 202, an actuator piston assembly 204, a poppet valve assembly 206, a selector piston assembly 208, and a pin assembly 210. The emulator assembly 110 also includes a pedal feel simulator 212, a normally open solenoid valve 214, a selector piston spring 216, and an actuator piston spring 218. A travel sensor assembly 220 is coupled to the cylinder 202.

The actuator piston assembly 204 is slidably disposed within the cylinder 202. The actuator piston assembly 204 and the cylinder 202 define an actuator chamber 222. The actuator chamber 222 is in fluid communication with the reservoir 104 (see FIG. 1) through the poppet valve assembly 206 when the poppet valve assembly 206 is not in a sealed position against the selector piston assembly 208. The actuator piston assembly 204 is coupled to the poppet valve assembly 206 by the actuator piston spring 218 and an actuator shaft 224.

The poppet valve assembly 206 is moveably disposed within the cylinder 202. The poppet valve assembly 206 is coupled to the selector piston assembly 208 and is configured to be supported by the selector piston assembly 208, as described further below.

The selector piston assembly 208 is slidably disposed within the cylinder 202 and is biased rightward (with reference to FIG. 2) by the selector piston spring 216 which is disposed between the selector piston assembly 208 and the cylinder 202. The selector piston assembly 208, the cylinder 202, and the normally open solenoid valve 214 define a selector chamber 226. The solenoid valve 214 is a normally open bidirectional solenoid valve. The solenoid valve 214 is thus configured to fluidly isolate the selector chamber 226 from the reservoir 104 when energized. When the normally open solenoid valve 214 is not energized, it provides unrestricted fluid communication between the selector chamber 226 and the reservoir 104.

The pin assembly 210 is positioned about the selector piston assembly 208. The pin assembly 210 is fixedly coupled to the cylinder 202. The selector piston assembly 208 is configured to slide with respect to the pin assembly 210.

The pedal feel simulator 212 is also coupled to the cylinder 202 via an inlet 228 and an outlet 230. The inlet 228 is fluidly coupled to the actuator chamber 222, while the outlet 230 is coupled to the reservoir 104 by a fluid path about the selector piston assembly 208 and the pin assembly 210.

Fluid passageways 232 and 234 fluidly coupled the emulator assembly 110 to the reservoir 104 (see FIG. 1) through the master cylinder assembly 106. Specifically, the fluid passageway 232 is fluidly coupled to the actuator chamber 222 when the poppet valve assembly 206 is not in a sealed position against the selector piston assembly 208. Further, the fluid passageway 234 is fluidly coupled to the selector chamber 226 when the normally open solenoid valve 214 is not energized.

Figures 3A, 3B:
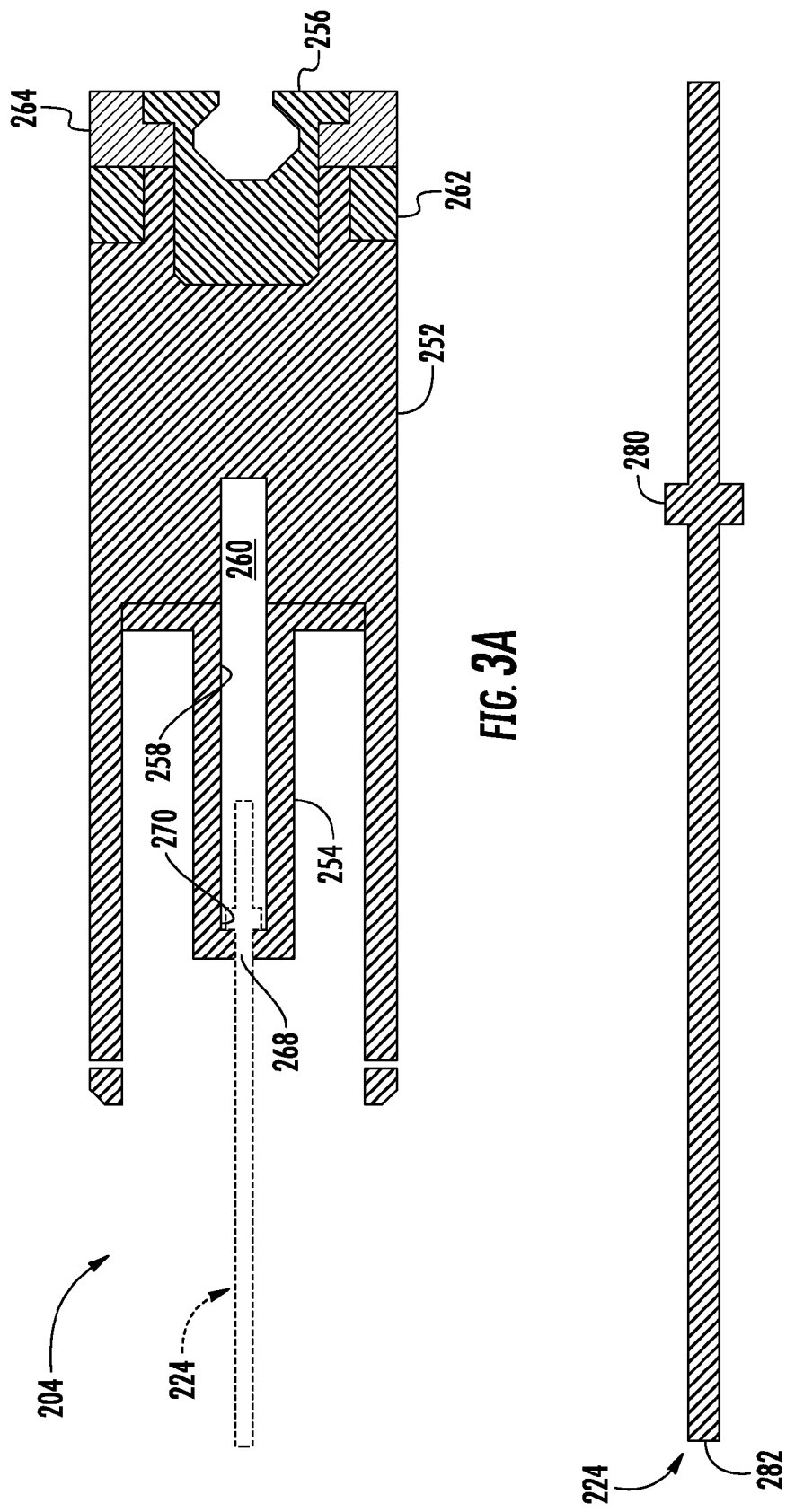
FIG. 3A depicts a cross sectional view of the actuator piston assembly of FIG. 2.
FIG. 3B depicts a cross section view of the actuator shaft of FIG. 2.

Referring to FIG. 3A, the actuator piston assembly 204 is depicted. The actuator piston assembly 204 includes a body portion 252, an actuator bracket 254, and a ball-and-socket interface 256. The ball portion 144 of the input rod assembly 130 (see FIG. 1) is coupled to the ball-and-socket interface 256 and is thereby configured to rotate with respect to the emulator assembly 110. The actuator bracket 254 includes a rearward facing cavity 258 which is aligned with a cavity 260 formed in the body portion 252. Attached to the body portion 252 are also a magnet 262 and an apply link extension 264. The apply link extension 264 is fixedly coupled to the apply link 132 (see FIG. 1).

The actuator bracket 254 includes a central opening 268 through which the actuator shaft 224 is slidably received. The central opening 268 is smaller than the rearward facing cavity 258, thereby defining a step 270 at the transition between the central opening 268 and the rearward facing cavity 258.

Referring to FIG. 3B, the actuator shaft 224 is depicted. The actuator shaft 224 includes a key portion 280 and an end portion 282. The key portion 280 interfaces with the step 270 of the actuator piston assembly 204 in order to limit leftward movement, with reference to FIG. 2, of the actuator shaft 224. The end portion 282 interfaces with the poppet valve assembly 206, as discussed in further detail with respect to FIG. 4.

The poppet valve assembly 206, depicted in FIG. 4, includes a poppet housing 302, a poppet body 304, a poppet spring 306, and a seal 308. The poppet spring 306 is located between the poppet housing 302 and the poppet body 304 and is configured to bias the poppet body 304 leftward, with reference to FIG. 4. The poppet body 304 is sealingly coupled to the poppet housing 302 by the seal 308, and is configured to slide within the poppet housing 302. The poppet body 304 is fixedly coupled to the actuator shaft 224. In particular, the poppet body 304 interfaces with the end portion 282 of the actuator shaft 224.

The poppet housing 302 includes a step 310 which interfaces with the actuator piston spring 218 on the right side of the step 310, with reference to FIG. 4. On the left side of the step 310, the poppet valve assembly 206 interfaces with the selector piston assembly 208 (see FIG. 2).

Figure 5B:
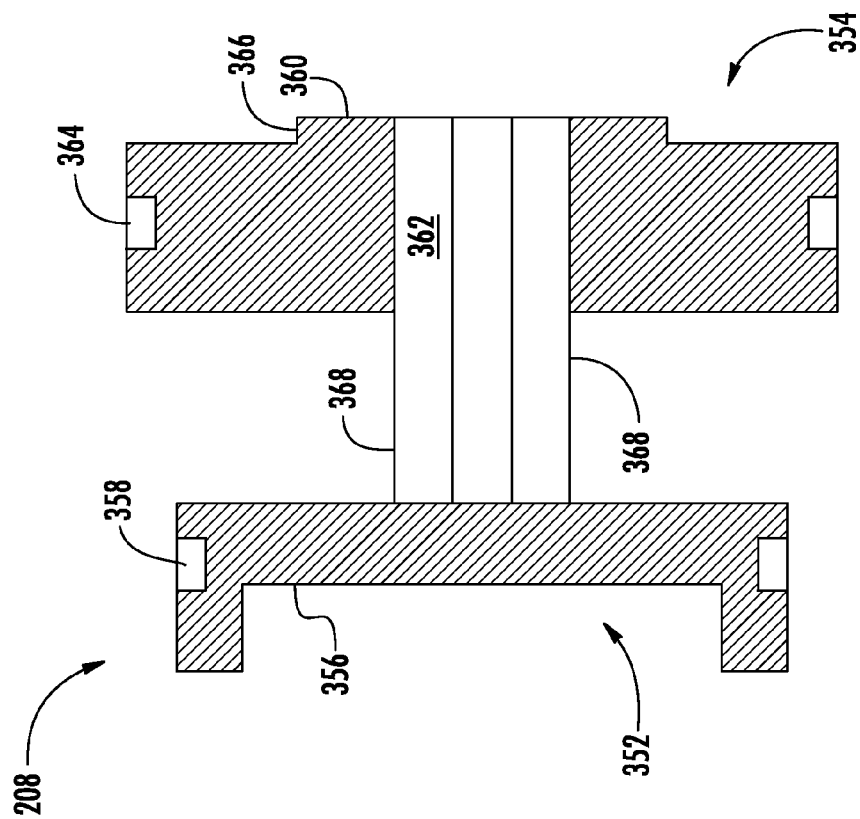
FIG. 5B depicts a cross sectional view of the selector valve assembly of FIG. 2.

Referring to FIGS. 5A and 5B, a front view and a cross sectional view of the selector piston assembly 208 are depicted, respectively. In general the selector piston assembly 208 is divided into a front portion 352 and a rear portion 354. The front portion 352 includes a front face 356, a seal 358, and four wedges 368. The rear portion 354 includes a sealing face 360, a cavity 362, a seal 364, and a step 366. While the selector piston assembly 208 is depicted as a single piece (i.e., the front portion 352 and the rear portions 354 are depicted as a unitary component), the reader should understand that the front portion 352 and the rear portion 354 may be two separate pieces that are assembled about the pin assembly 210.

The front portion 352 interfaces with the selector spring 216. In particular, the front face 356 provides a seating surface for the selector spring 216. As described above, the front portion 352, the cylinder 202, and the normally open valve 214 define the selector chamber 226. The rear portion 354 interfaces with the poppet valve assembly 206. In particular, the step 366 interfaces with the step 310 of the poppet housing 302 of the poppet valve assembly 206. The sealing face 360 provides a sealing surface for the seal 308 of the poppet valve assembly 206. The cavity 362 provides a space for slidably receiving elongated members of the pin assembly 210.

Figure 6:
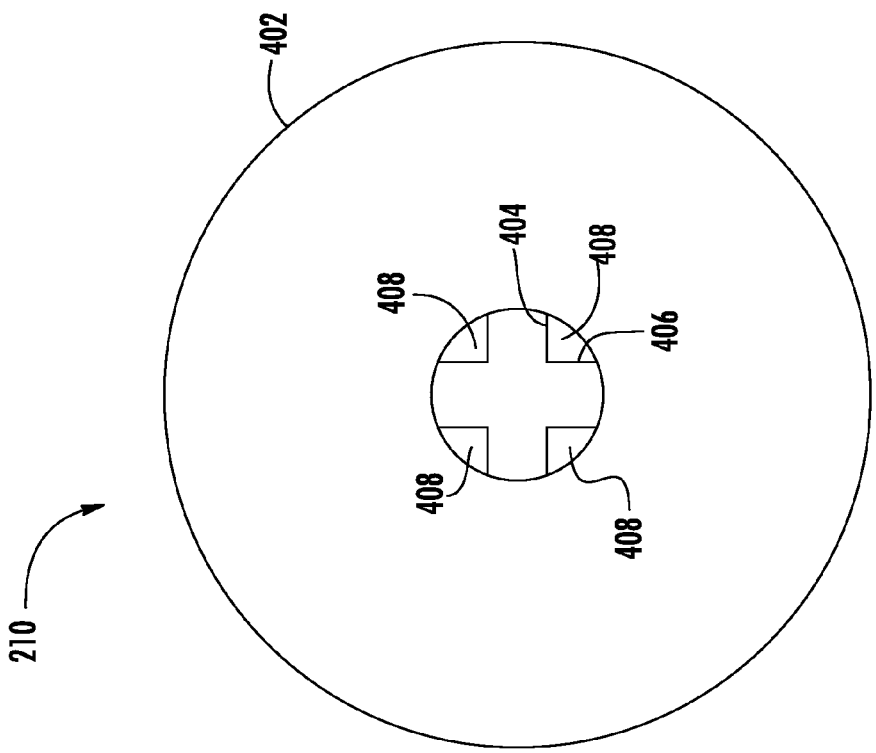
FIG. 6 depicts a front view of the pin assembly of FIG. 2.

Referring to FIG. 6, the pin assembly 210 is depicted. The pin assembly 210 includes a disk portion 402 and elongated members 404 and 406 projecting rearwardly from the disk portion 402. The elongated members 404 and 406 form a cross-shaped pin. As described above, the selector pin assembly 208 is formed or assembled about the pin assembly 210. As a result, openings 408 are formed on the disk portion 402 to allow passage of the front portion 352 of the selector piston assembly 208 and in particular the four wedges 368 (see FIG. 5B) through the opening 408. The four wedges 368 engage the rear portion 354 of the selector piston assembly 208, e.g. by threads. Other interfaces between the selector piston assembly 208 and the pin assembly 210 are also possible. In any of these interfaces, the selector piston assembly 208 is configured to slide with respect to the pin assembly 210 which has a fixed position with respect to the cylinder 202.

Operation of the brake assembly 100 is described with respect to two different modes. In the first mode, hereinafter referred to as the normal mode, the normally open valve 214 is energized by the ECU (not shown). The normal mode corresponds to an operational mode in which the high pressure regulating system 102 is working normally and producing appropriate fluid pressures. In the second mode, hereinafter referred to as the fallback mode, the normally open valve 214 is not energized. The fallback mode corresponds to an operational mode in which the high pressure regulating system 102 is not working properly and thereby not producing appropriate fluid pressures in the boost chamber 116.

With reference to FIG. 2, the input rod assembly 130 is coupled to the brake pedal (not shown) and to the actuator piston assembly 204 which is depicted in an unapplied condition (i.e., with the brake pedal (not shown) in an unapplied position). The actuator chamber 222 is in fluid communication with the pedal feel simulator 212 through the inlet 228. Also, the actuator chamber 222 is selectively in fluid communication with the reservoir 104 via the poppet valve assembly 206 through the openings 408 of the pin assembly and through the fluid passageway 232.

In the unapplied condition, the poppet valve spring 306 is in a state of compression (i.e., the poppet body 304 is biased leftward, with reference to FIG. 4). The interface between the step 270 of the actuator bracket 254 of the actuator piston assembly 204 and the key portion 280 of the actuator shaft 224, limits the leftward movement of the actuator shaft 224. Therefore, while the poppet body 304 is biased leftward, the leftward travel of poppet body 304, being fixedly coupled to the actuator shaft 224, is limited. The rest position hereinafter is also referred to as the deactivated position or the rearward position of the poppet valve assembly 206.

In the normal mode, as described above, the normally open valve 214 is energized. As an operator of a vehicle applies force to the brake pedal (not shown) the input rod assembly 130 moves leftward.

The actuator piston assembly 204 moves leftward because of the leftward movement of the input rod assembly 130. The actuator spring 218 compresses because of the leftward movement of the actuator piston assembly 204, which applies a leftward force to the housing 302 of the poppet valve assembly 206. The poppet valve assembly 206 transfers the leftward force to the selector piston assembly 208. Since the normally open solenoid valve 214 is energized, the selector piston chamber 226 is isolated from fluid communication with the reservoir 104. Therefore, since the fluid is contained in the selector chamber 226, the above mentioned leftward force results in no movement of the selector piston assembly 208. The depicted position of the selector piston assembly 208 with the normally open solenoid valve 214 being energized may hereinafter be called the first position of the selector piston assembly 208.

With the leftward movement of the actuator piston assembly 204 the step 270 of the actuator bracket 254 and the key portion 280 are no longer limiting the leftward movement of the actuator shaft 224 which is fixedly coupled to poppet body 304. Since the poppet spring 306 in a compressed state, the poppet body 304 moves leftward. Continuous leftward movement of the actuator piston assembly 204 allows further leftward movement of the poppet body 304 until the poppet body 304 makes contact with the sealing surface 360.

Since the selector piston assembly 208 is hydraulically locked with respect to the cylinder 202, the poppet assembly 206 is in contact with the selector piston assembly 208, and the actuator shaft 224 is fixedly coupled to the poppet assembly 206, the actuator shaft 224 is unable to move leftward once the poppet valve assembly 206 makes contact with the selector piston assembly 208. As a result, the key portion 280 separates from the step 270 of the actuator piston assembly (see FIGS. 3A and 3B). Continued leftward movement of the actuator piston assembly 204, with the key the portion 280 remaining stationary, allows the actuator shaft to move within the rearward facing cavity 258 of the actuator bracket 254 or even into the cavity 260 of the body portion 252 of the actuator piston assembly 204, as depicted in FIGS. 7 and 8.

Once the poppet body 304 makes contact with the sealing face 360 of the selector piston assembly 208, the actuator chamber 222 is no longer in fluid communication with the reservoir 104 via pin assembly 210 (i.e., through the opening 408, see FIG. 6, and through the passageway 232, see FIG. 2). Since the actuator chamber 222 is isolated from the reservoir, fluid within the actuator chamber 222 enters the pedal feel simulator 212 through the inlet 228. The pedal feel simulator 212 is of the type that is known in the art. Generally, this type of pedal feel simulator includes a high pressure side and a low pressure side. The high pressure side communicates with the actuator chamber 222 via the inlet 228. The low pressure side vents to the reservoir 104 via the outlet 230, and as in the case of the braking system 100, through the master cylinder assembly 106 (see FIG. 1). The high pressure side of this type of pedal simulator typically includes a piston which is biased away from a bottom portion of a cylinder by one or more simulator springs. The piston is fluidly coupled to the actuator chamber 222 via the inlet 228. Pressure build up in the actuator chamber 222 causes the piston to move against the biasing force of the simulator springs which provides a pedal feel of a conventional braking system to the operator. The low pressure side is vented to the reservoir 104 in order to prevent a hydraulic lock situation. In alternative embodiments, the low pressure side is of a pneumatic type and is coupled to the atmosphere to prevent a pneumatic lock situation.

As the operator moves the brake pedal (not shown), as described above, leftward movement of the actuator piston assembly 204 also causes leftward movement of the magnet 262 (see FIG. 3A). The travel sensor assembly 220 is configured to sense position of the magnet 262, and thereby determines the position of the brake pedal (not shown), and to generate a corresponding signal which it communicates with the ECU (not shown). The ECU (not shown) correspondingly controls the regulating valve assembly 114 which regulates pressure in the boost chamber 116. In response to fluid pressure in the boost chamber 116, the booster piston 128 moves leftward which moves the primary piston 122 and the secondary piston 124 in order to pressurize fluid in the downstream braking circuits (not shown). As a result, the booster piston 128 applies a boosted force to the primary and secondary pistons 122 and 124 to effectuate the braking function.

While the apply link 132 which is positioned near the booster piston 128 is coupled to the input rod assembly 130 and moves leftward with the leftward movement of the input rod assembly 130, the booster piston 128 is mechanically decoupled from the input rod assembly 130, and thus from the brake pedal (not shown). Specifically, the apply link 132 does not make contact with the booster piston 128. Therefore, the only feedback the operator receives from the brake pedal (not shown) is from the actuator spring 218 and the pedal feel simulator 212.

When the operator releases the brake pedal (not shown), the actuator piston assembly 204 returns to the unapplied position (see FIG. 2). Prior to reaching the unapplied position, the poppet valve assembly 206 unseals from the selector piston assembly 208 and the actuator chamber 222 returns to fluid communication with the reservoir through the poppet valve assembly 206.

In the fallback mode, the braking system 100 is initially in condition of FIG. 1 and operates similar to the normal mode except that the normally open solenoid valve 214 is not energized. As a result, the selector chamber 226 remains in fluid communication with the reservoir 104 through the normally open solenoid valve 214 and through the fluid passageway 234 (see FIG. 2). Therefore, the abovementioned leftward force applied by the poppet valve assembly 206 to the selector piston assembly 208 causes the selector piston assembly 208 to move leftward, thereby collapsing the selector chamber 226 by compressing the selector spring 216, as depicted in FIG. 9. The depicted position in FIG. 9 is hereinafter referred to as the second position of the selector valve assembly 208.

Figure 10:
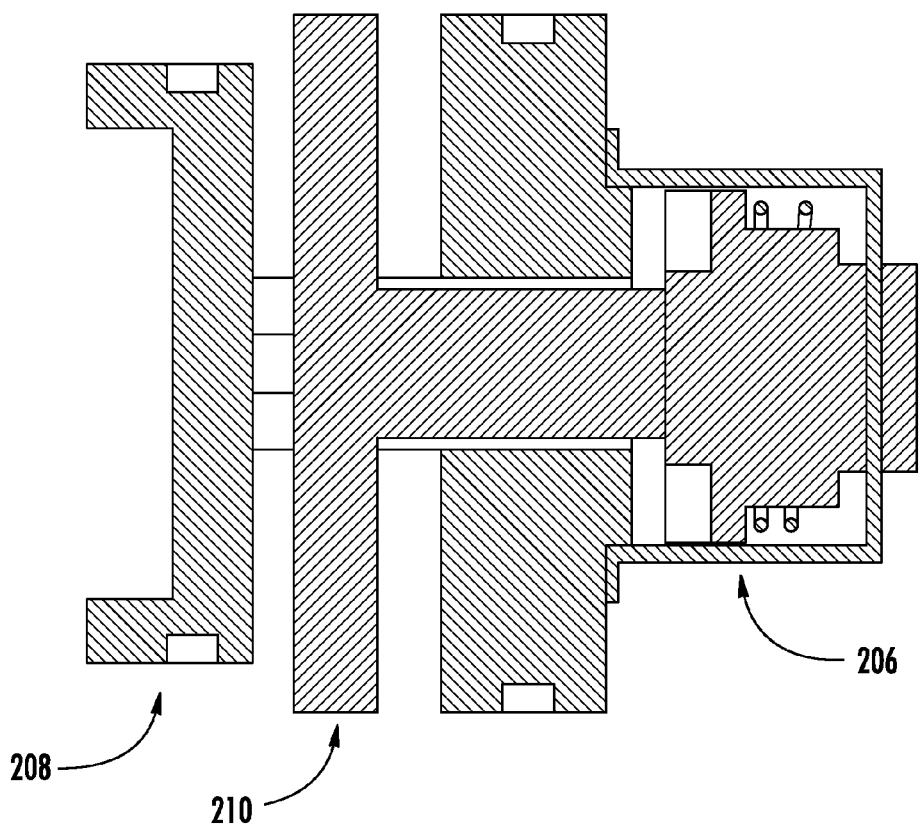
FIG. 10 depicts an enlarged fragmentary cross sectional view of a portion of the emulator assembly of FIG. 9.

Referring to FIG. 10, an enlarged fragmentary cross sectional view of the pin assembly 210 and the poppet valve assembly 206 is depicted. Leftward movement of the selector piston assembly 208 exposes the elongated members 404 and 406 of the pin assembly 210, which is fixedly coupled to the cylinder 202. With the elongated members 404 and 406 exposed, the poppet valve assembly 206 (specifically, the poppet body 304) cannot seal against the sealing face 360 of the selector piston assembly 208. The depicted position of the poppet valve assembly 206 is hereinafter referred to as the forward position or the actuated position. Therefore, the actuator chamber 222 remains in fluid communication with the reservoir 104 through the poppet valve assembly 206. As a result, fluid does not enter the pedal feel simulator 112 through the inlet 228 (see FIG. 2).

In the fallback mode, the ECU (not shown) does not control the regulating valve assembly 114 which regulates pressure in the boost chamber 116. As a result, the booster piston 128 is not moved by boost pressure in the boost chamber 116 as the operator is moving the brake pedal (not shown), thereby effectuating no boosted braking function.

Because the booster piston 128 is not moving, movement of the input rod assembly 130 moves the apply link 132 into contact with rear portion 136 of the booster piston 128 (see FIG. 1). The apply link 132 is coupled to the input rod 130 through the actuator piston assembly 204 (see FIG. 2) and is configured to move leftward along with leftward movement of the input rod assembly 130. Once the apply link 132 makes contact with the rear portion 136 of the booster piston 128, the operator is able to move the primary and secondary pistons 122 and 124 to provide the desired braking function without a booster function or with a degraded booster function. In addition, with the brake pedal (not shown), now mechanically coupled to the primary and secondary pistons 122 and 124, the operator receives the feedback at the brake pedal (not shown) corresponding to springs in the primary chamber 118 and the secondary chamber 120, the hydraulic force from the fluid in the downstream braking circuits (not shown), and the actuator spring 218.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A braking system comprising:
an emulator cylinder;
an emulator actuator piston within the emulator cylinder;
an emulator actuator chamber within the emulator cylinder defined in part by the emulator actuator piston;
a pedal feel simulator including an input port in fluid communication with the emulator actuator chamber and an output port;
a selector piston movable within the emulator cylinder between a first position and a second position; and
a poppet valve operably connected to the emulator actuator piston, the poppet valve movable by the emulator actuator piston between a deactivated position and an actuated position and configured such that (i) when the selector piston is in the first position and the poppet valve is in the actuated position, the poppet valve is closed and the emulator actuator chamber is not in fluid communication with the reservoir through the poppet valve, and (ii) when the selector piston is in the second position and the poppet valve is in the actuated position, the poppet valve is open and the emulator actuator chamber is in fluid communication with the reservoir through the poppet valve.

2. The braking system of claim 1, further comprising:
a selector chamber adjacent to a first end portion of the selector piston; and
a normally open solenoid valve positioned between the selector chamber and the reservoir and configured to isolate the selector chamber from the reservoir in an energized state and to allow fluid communication between the selector chamber and the reservoir in a de-energized state.

3. The braking system of claim 2, further comprising:
a selector piston spring with a first spring constant and configured to bias the selector pin toward the first position; and
an emulator actuator piston spring with a second spring constant and positioned between the selector piston and the emulator actuator piston and configured to bias the emulator actuator piston to position the poppet valve at the deactivated position, wherein the second spring constant is greater than the first spring constant.

4. The braking system of claim 1, wherein the poppet valve is seated against the selector piston when the selector piston is in the first position and the poppet valve is in the actuated position.

5. The braking system of claim 1, further comprising:
a pin positioned within the emulator cylinder and configured such that (i) when the selector piston is in the first position the poppet valve cannot contact the pin and (ii) when the selector piston is in the second position the poppet valve can contact the pin.

6. The braking system of claim 1, further comprising:
a master cylinder;
a boost piston including a first portion located within the master cylinder and a second portion; and
an apply link extending from the emulator actuator piston and movable between a first position whereat the apply link is spaced apart from the second portion and a second position whereat the apply link is operably contacting to the second portion.

7. The braking system of claim 6, further comprising:
a selector chamber adjacent to a first end portion of the selector piston; and
a normally open solenoid valve positioned between the selector chamber and the reservoir and configured to isolate the selector chamber from the reservoir in an energized state and to allow fluid communication between the selector chamber and the reservoir in a de-energized state.

8. The braking system of claim 7, further comprising:
a selector piston spring with a first spring constant and configured to bias the selector pin toward the first position; and
an emulator actuator piston spring with a second spring constant and positioned between the selector piston and the emulator actuator piston and configured to bias the emulator actuator piston to position the poppet valve at the deactivated position, wherein the second spring constant is greater than the first spring constant.

9. The braking system of claim 8, wherein the poppet valve is seated against the selector piston when the selector piston is in the first position and the poppet valve is in the actuated position.

10. The braking system of claim 8, further comprising:
a pin positioned within the emulator cylinder and configured such that (i) when the selector piston is in the first position and the poppet valve does not contact the pin and (ii) when the selector piston is in the second position the poppet valve can contact the pin.

11. A braking system comprising:
an emulator cylinder;
an emulator actuator piston within the emulator cylinder;
an emulator actuator chamber located forwardly of the emulator actuator piston within the emulator cylinder;
a pedal feel simulator including an input port in fluid communication with the emulator actuator chamber and an output port;
a selector piston located forwardly of the emulator actuator chamber and movable within the emulator cylinder between a first position and a second position; and
a poppet valve operably connected to the emulator actuator piston, the poppet valve movable by the emulator actuator piston between a rearward position and a forward position and configured such that (i) when the selector piston is in the first position the poppet valve can be seated against the selector piston with the emulator actuator chamber not in fluid communication with a reservoir through the poppet valve, and (ii) when the selector piston is in the second position the poppet valve cannot be seated against the selector piston and the emulator actuator chamber is in fluid communication with the reservoir through the poppet valve.

12. The braking system of claim 11, further comprising:
a selector chamber located within the emulator cylinder forwardly of the selector piston; and
a normally open solenoid valve positioned between the selector chamber and the reservoir and configured to isolate the selector chamber from the reservoir in an energized state and to allow fluid communication between the selector chamber and the reservoir in a de-energized state.

13. The braking system of claim 12, further comprising:
a selector piston spring with a first spring constant positioned within the selector chamber and operably connected to the selector pin to bias the selector pin toward the first position; and
an emulator actuator piston spring with a second spring constant positioned within the emulator actuator chamber and configured to bias the selector piston and the emulator actuator piston away from one another, wherein the second spring constant is greater than the first spring constant.

14. The braking system of claim 11, further comprising:
a pin positioned within the emulator cylinder and exposable by the selector piston such that (i) when the selector piston is in the first position the pin does not preclude seating of the poppet valve on the selector piston and (ii) when the selector piston is in the second position the pin precludes seating of the poppet valve on the selector piston.

15. The braking system of claim 11, further comprising:
a master cylinder;
a boost piston including a first portion located within the master cylinder and a second portion extending from the master cylinder; and
an apply link operably connected to the emulator actuator piston and movable between a first position whereat the apply link is spaced apart from the second portion and a second position whereat the apply link is operably contacting to the second portion.

16. The braking system of claim 15, further comprising:
a selector chamber adjacent to a first end portion of the selector piston; and a normally open solenoid valve positioned between the selector chamber and the reservoir and configured to isolate the selector chamber from the reservoir in an energized state and to allow fluid communication between the selector chamber and the reservoir in a de-energized state.

17. The braking system of claim 16, further comprising:

a selector piston spring with a first spring constant and configured to bias the selector pin toward the first position; and an emulator actuator piston spring with a second spring constant and positioned between the selector piston and the emulator actuator piston and configured to bias the emulator actuator piston to position the poppet valve at the deactivated position, wherein the second spring constant is greater than the first spring constant.

18. The braking system of claim 17, further comprising:

a pin positioned within the emulator cylinder and exposable by the selector piston such that (i) when the selector piston is in the first position the pin does not preclude seating of the poppet valve on the selector piston and (ii) when the selector piston is in the second position the pin precludes seating of the poppet valve on the selector piston.

* * * * *